US008117904B2

(12) United States Patent
Chesney et al.

(10) Patent No.: US 8,117,904 B2

(45) Date of Patent: Feb. 21, 2012

(54) SYSTEM AND METHOD FOR EVALUATING AN INTEGRATED COIL ON PLUG IGNITION SYSTEM

(75) Inventors: David James Chesney, Northville, MI (US); Harry Kekedjian, Tecumseh (CA)

(73) Assignee: Ford Global Technologies, LLC, Dearborn, MI (US)

( * ) Notice: Subject to any disclaimer, the term of this patent is extended or adjusted under 35 U.S.C. 154(b) by 363 days.

(21) Appl. No.: 12/415,057

(22) Filed: Mar. 31, 2009

(65) Prior Publication Data

US 2010/0242583 A1 Sep. 30, 2010

(51) Int. Cl.
*G01M 15/04* (2006.01)

(52) U.S. Cl. .................................................... 73/114.62

(58) Field of Classification Search ............... 73/114.58, 73/114.62; 324/388, 525
See application file for complete search history.

(56) References Cited

U.S. PATENT DOCUMENTS 5,945,828 A * 8/1999 Katogi et al. ................. 324/399
5,947,093 A 9/1999 Ward
6,142,130 A 11/2000 Ward
6,305,365 B1 10/2001 Maeoka et al.
6,323,603 B1 11/2001 Persson
6,426,626 B1 * 7/2002 Kravis .......................... 324/388
6,603,216 B2 8/2003 Costello
6,850,070 B2 2/2005 McQueeney et al.
7,550,974 B2 * 6/2009 Schneider et al. ............ 324/388
7,624,717 B2 * 12/2009 Inada et al. .............. 123/406.12
7,789,595 B2 * 9/2010 Tanaya ............................ 406/13
7,792,633 B2 * 9/2010 Hamama et al. .............. 701/114
7,908,910 B2 * 3/2011 Tanaya ....................... 73/114.08
2008/0148831 A1 6/2008 Kekedjian et al.
2010/0004846 A1 * 1/2010 Hamama et al. .............. 701/103
2010/0101313 A1 * 4/2010 Tanaya ....................... 73/114.67
2010/0122689 A1 * 5/2010 Tanaya ..................... 123/406.26
* cited by examiner

*Primary Examiner* — Freddie Kirkland, III
(74) *Attorney, Agent, or Firm* — Frank A. MacKenzie; Brooks Kushman P.C.

(57) ABSTRACT

In at least one embodiment, an apparatus for evaluating performance of an integrated coil on plug (CoP) assembly is provided. The apparatus comprises a controller. The controller is configured to transmit a control signal to activate the CoP assembly. The controller is further configured to receive an indirect signal including a low frequency (LF) component from the CoP assembly responsive to the control signal. The controller is further configured to compare the LF component to predetermined data to evaluate the performance of the CoP assembly.

20 Claims, 6 Drawing Sheets

SYSTEM AND METHOD FOR EVALUATING AN INTEGRATED COIL ON PLUG IGNITION SYSTEM

BACKGROUND

1. Technical Field

One or more embodiments of the present invention generally relate to a system and method for evaluating an integrated coil on plug ignition system for an internal combustion engine.

2. Background Art

An ignition system for an internal combustion engine is an electrical system that provides a spark for igniting fuel within the engine to initiate combustion. The ignition system typically comprises an ignition coil coupled to both a electrical switch and a spark plug. The spark is triggered by an interruption of current flow within the ignition system which creates a high voltage signal that arcs across a spark plug to create a spark. There is a trend within automotive industry to mount the ignition coil directly to the corresponding spark plug. Such a system may be referred to as a coil-on-plug (CoP) ignition system. Additional trends within the automotive industry include integrating each electrical switch into a housing of the corresponding CoP assembly. Such a system may be referred to as an integrated CoP ignition system.

The ignition system is typically assembled to the engine at an engine assembly plant. An End of Line (EOL) tester may be used to evaluate the performance of the engine and its associated systems. Conventional EOL testers evaluate the ignition system by measuring an electrical signal present on an ignition circuit between the ignition coil and the electrical switch. A flyback voltage signature is present on the electrical signal when the ignition coil is fired. The flyback voltage is measured and compared to pre-existing data to evaluate the ignition system. Such an ignition system generally provides an external point that is accessible to a user to monitor the electrical signal.

However, by integrating the switch within the housing of the ignition coil, it may not be possible to gain access to any point between the ignition coil and the electrical switch. As such, the flyback voltage is not capable of being ascertained.

One conventional strategy for evaluating the performance of an integrated CoP ignition system includes obtaining the flyback voltage via an RF based system for example. An RF based antenna may detect an electrically radiated inductive noise spike that is generated when the ignition coil is fired. Such an approach requires an array of antennas and additional sensors that are sensitive to the placement and pickup of other uncontrolled stray electrical noise.

SUMMARY

In at least one embodiment, an apparatus for evaluating performance of an integrated coil on plug (CoP) assembly is provided. The apparatus comprises a controller. The controller is configured to transmit a control signal to activate the CoP assembly. The controller is further configured to receive an indirect signal including a low frequency (LF) component from the CoP assembly responsive to the control signal. The controller is further configured to compare the LF component to predetermined data to evaluate the performance of the CoP assembly.

DETAILED DESCRIPTION

In general, with an engine EOL test apparatus for evaluating an ignition system, a test stand is electrically coupled to an ignition system of an engine. The test stand controls the firing of the ignition system while evaluating the performance of the ignition system. If an integrated CoP ignition system is tested, then a flyback voltage measurement location disclosed in the prior art is no longer externally accessible. An apparatus and method is provided for evaluating an integrated CoP ignition system.

Figure 1:
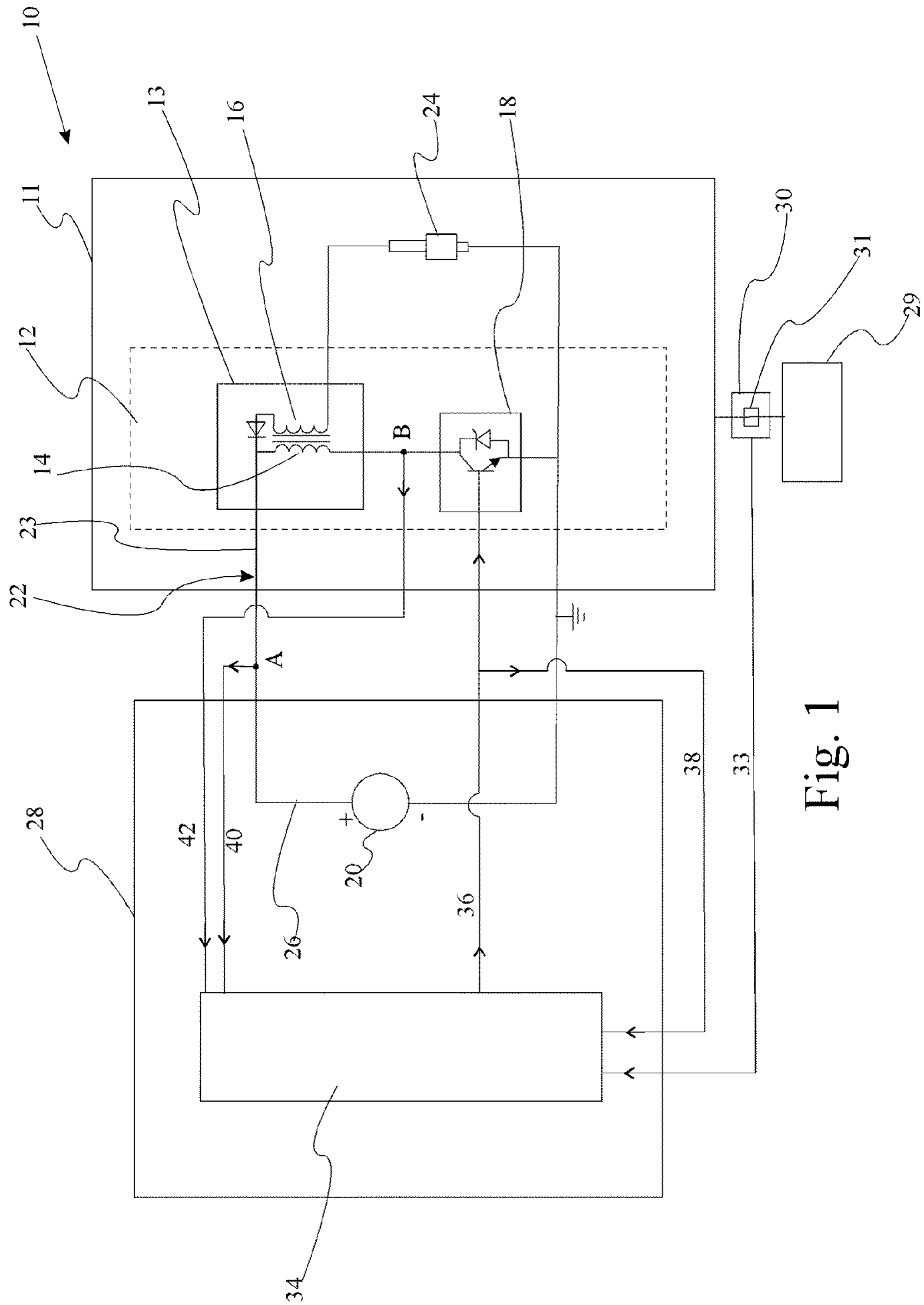
FIG. 1 is a diagram of an apparatus for indirect measurement of an integrated coil on plug ignition system.

FIG. 1 is an EOL test apparatus 10 in accordance with one embodiment of the present invention. The apparatus 10 includes a test stand 28 and an engine 11 coupled to each other. The engine 11 includes an integrated CoP assembly 12. The test stand 28 is configured to evaluate the performance of the CoP assembly 12.

A spark plug 24 is operatively coupled to the engine 11 and electrically coupled to the integrated CoP assembly 12. It is generally recognized that the engine 11 may include a plurality of integrated CoP assemblies, each being parallely coupled to one another and each being coupled to a corresponding spark plug 24. For brevity, a single integrated CoP assembly 12 is shown that is coupled to a single spark plug 24.

The integrated CoP assembly 12 includes an ignition coil 13 and an integrated switch 18 that are operably coupled to one another. The ignition coil 13 includes a primary coil 14 and a secondary coil 16 electromagnetically coupled to one another. A DC power supply 20, positioned within the test stand 28 delivers electrical power to the ignition coil 13.

The ignition coil 13 acts as a step up transformer to convert a low voltage signal on the primary coil 14 to a high voltage signal on the secondary coil 16 for firing the spark plug 24. The primary coil 14 and secondary coil 16 are both wrapped around a common iron core. A controller 34, positioned in the test stand 28 is configured to control the switch 18 to open or close. When the switch 18 is closed, current flows through the primary coil 14 to establish a magnetic field within the ignition coil 13. When the controller 34 opens the switch 18, the current flow in the primary coil 14 is interrupted which induces a high voltage in the secondary coil 16. The high voltage arcs across a gap on the spark plug 24 which generates a spark. The induced voltage on the secondary coil 16 is proportional to the rate of change of the magnetic field, therefore an electrical switch 18 that switches quickly may be used. In one example, the switch 18 may be implemented as an insulated-gate bipolar transistor (IGBT). It is generally recognized that other suitable switching devices/mechanisms may be used. The particular type of switching device that is implemented may vary based on the desired criteria of a particular implementation.

The controller 34 may include signal conditioning equipment (not shown). The signal conditioning equipment may include a demodulator (not shown) that comprises filters for rejecting any undesired portions of a received signal. The signal conditioning equipment may also include a transformer (not shown) to scale the amplitude of the received signals to conform to an optimum dynamic range. The controller 34 may also include high speed data acquisition equipment "DAQ" (not shown) for digitizing the conditioned signals. The controller 34 accesses and analyzes the digitized signals (data) using signal analysis software.

A wire harness 23 is coupled between the power supply 20 and the CoP assembly 12. An ignition circuit 22 is generally defined as the circuit formed by the power supply 20, the integrated CoP 12 (including the ignition coil 13, the switch 18) and the spark plug 24. The ignition circuit 22 includes a primary circuit and a secondary circuit. The primary circuit is generally defined as a circuit formed by the power supply 20, the primary coil 14 (of the integrated CoP 12), the switch 18 and the electrical connections between these components. The secondary circuit is generally defined as a circuit formed by the secondary coil 16 (of the integrated CoP 12) the spark plug 24 and the electrical connection between these components. The secondary circuit receives electrical power from the primary circuit, when the ignition coil 13 is fired, by the coupling between the primary coil 14 and the secondary coil 16.

The EOL test apparatus 10, may be used to test an engine 11 that is driven by combustion. Alternatively the apparatus 10 may be used for "cold motor" testing, where the engine 11 is driven by an alternate power supply. A servomotor 29 provides mechanical power to drive the engine 11 for performing "cold motor" testing on various aspects of the engine 11. An adapter 30 couples the servomotor 29 to a crankshaft (not shown) of the engine 11.

The engine 11 includes a series of cylinders (not shown) and corresponding internal pistons (not shown). The pistons are typically driven by combustion to actuate within the cylinders as the engine operates. A crankshaft (not shown) is coupled to the pistons, such that the crankshaft rotates as the pistons actuate. The engine is vacuum sealed to allow pressure to build within the cylinders during engine operation. Each cylinder is operatively coupled to one of the spark plugs 24. A crankshaft sensor 31 measures the position of the crankshaft of the engine 11. The crankshaft sensor 31 transmits a position signal 33 that corresponds to the present position of the crankshaft, to the controller 34. The controller 34 analyzes the crankshaft position to determine the timing of the actuation of the pistons, such that the controller can fire a spark plug 24, via the ignition coil 13, when the corresponding cylinder is under compression.

The controller 34 analyzes the position signal 33 so that the controller 34 may control the timing of the integrated CoP assembly 12. The controller 34 transmits a control signal 36 to the switch 18 in response to the position signal 33. The control signal 36 corresponds to the desired state of the switch 18 (e.g. "open" or "closed"). As noted above, while FIG. 1 only illustrates a single integrated CoP assembly 12, it is recognized that the engine 11 may contain a plurality of integrated CoP assemblies being connected to one another. As such, the controller 34 coordinates the time in which each integrated CoP assembly 12 fires a corresponding cylinder under compression. The controller 34 receives a trigger signal 38 to begin recording data.

FIG. 1 includes point (A) and point (B) on the wire harness 23 and within the integrated CoP assembly 12, respectively, which indicates two different locations where conducted voltage measurements may be taken by the controller 34. For example, a hardwired connection may be established between the controller 34 and point (A), so that the controller 34 is capable of taking a voltage measurement at such a point. The controller 34 receives an indirect signal 40 on a node where point (A) is located (e.g. between the ignition coil 13 and the power supply 20). The controller 34 is also capable of receiving a flyback signal 42 on a node where point (B) is located (e.g. between the ignition coil 13 and the switch 18). With the integrated CoP assembly 12, it is not possible for the controller 34 to receive a signal from point B as point B is located within the housing of the integrated CoP assembly 12. However, point B is introduced to illustrate the manner in which data received on the indirect signal 40 is compared to data collected at point (B). The relevance of point B is used for illustrative purposes and will be described in more detail in connection with FIGS. 4A-4B.

The indirect signal 40 provides ignition signature information that can be used by the controller 34 to evaluate the performance of the integrated CoP 12. Such information will be discussed in more detail in connection with FIGS. 3 and 4A-4B.

The apparatus may be utilized for vehicle level diagnostic testing. For example, a service garage may implement a test apparatus for evaluating vehicle ignition systems.

Figure 2:
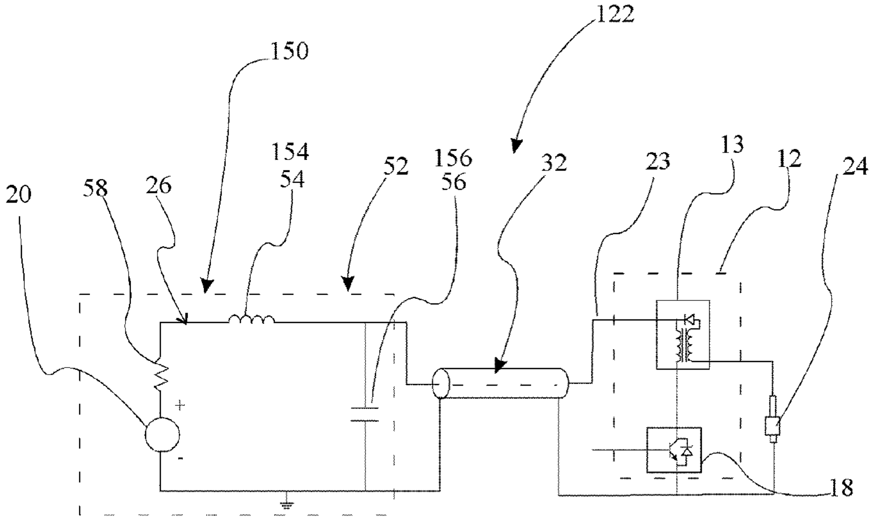
FIG. 2 is an equivalent ignition circuit diagram of the integrated coil on plug ignition system of FIG. 1, illustrating a transmission line effect.

FIG. 2 illustrates a circuit 122 that is generally equivalent to the circuit formed by the integrated CoP assembly 12, the power supply 20 and the spark plug 24 (e.g. the ignition circuit 22) of FIG. 1. Generally, electrical systems, especially those having long wire harnesses may have inherent impedance characteristics. The parasitic elements of the long wire harnesses may behave as a second order RLC Circuit. Thus, although the circuit 122 may not necessarily contain discrete components, it may function as an RLC circuit.

The transmission of signals along the circuit 122 is also generally governed by transmission line behavior. Generally, transmission line theory, as symbolized by a transmission effect 32, applies when the wavelength of the signal is on the order of the length of the physical wire harness 23.

The circuit 122 generally includes a parasitic impedance, which is attributed to external cabling and the type and quantity of inactive integrated CoP assemblies (not shown). The wire harnesses 23 as depicted FIG. 1 is generally defined as an external cable that may cause the presence of parasitic impedance. The type of integrated CoP assembly 12 generally refers to the design parameters and manufacturer of the specific integrated CoP assembly 12. The quantity of integrated CoP assemblies corresponds to the number of cylinders on the engine 11.

A series RLC resonant circuit 52 represents the parasitic impedance that may be present on the circuit 122. The RLC circuit 52 includes a parasitic inductance component that is represented by an inductor 54, a parasitic capacitive component that is represented by a capacitor 56 and a line resistance that is represented by a resistor 58.

Figure 3:
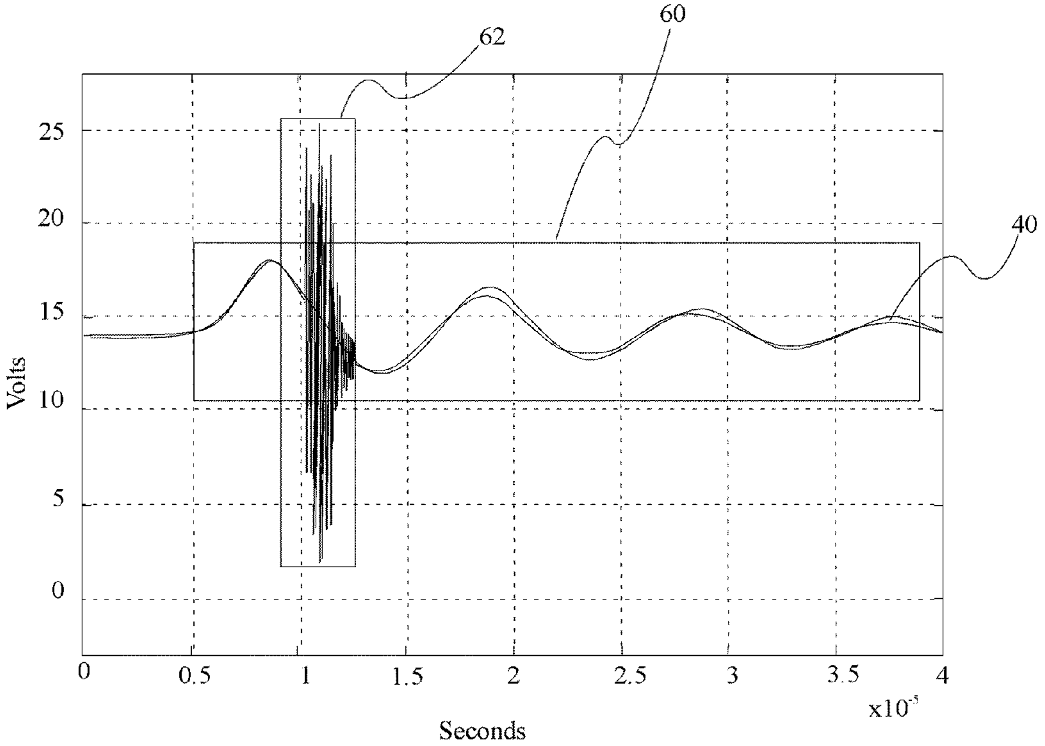
FIG. 3 illustrates signals measured at a point (A) of FIG. 1.

Referring to FIG. 3, a plot depicting various characteristics of the indirect signal 40 is shown. The indirect signal 40 includes a low frequency damped oscillation component (or "LF component") 60 and a high frequency impulse resonance component (or "HF component") 62 .

The LF component 60 directly correlates to the start of an ignition coil firing event. Energy is stored in the RLC circuit 52 during the coil dwell interval when the switch 18 is closed. Once the switch 18 is opened (e.g. in response to the control signal 36), the energy resonates/dissipates in the form of the LF component 60 on the indirect signal 40. The controller 34 is generally configured to measure the LF component 60 on the indirect signal 40. The LF component 60 generally includes a frequency in the range of 50 KHz to 250 KHz.

In contrast, the HF component 62 corresponds to the arcing event. The HF component 62 is generally present on the ignition circuit 22 and is an input to the controller 34 on the indirect signal 40. In general, the HF component 62 is generated by an arc that forms across a gap of the spark plug 24.

The HF component 62 may occur due to a quarter wavelength transmission line effect 32. Such an effect 32, is present at the indirect measurement (A) and allows the HF component 62 to be observed on the indirect signal 40 for analysis by the controller 34. It is generally recognized that the wavelength of the HF component 62 is on the order of or shorter than the length of the wire harness 23 to enable the transmission line effect 32 to occur. The HF component 62 includes a frequency of between 2 MHz and 30 MHZ.

It is generally contemplated that a tuned regulator 150 comprising discrete components may be added to the circuit 122 (or to any node between the power supply 20, the CoP assembly 12, and the spark plug 24 as shown in connection in FIG. 2) to further tune the LF component 60 that is transmitted on the indirect signal 40. The tuned regulator 150 includes a discrete inductor 154 and/or a discrete capacitor 156. The tuned regulator 150 tunes the LF component 60 on the indirect signal 40 by adjusting the resonant frequency, the amplitude and/or the damping characteristics of the LF component 60.

Figure 4A:
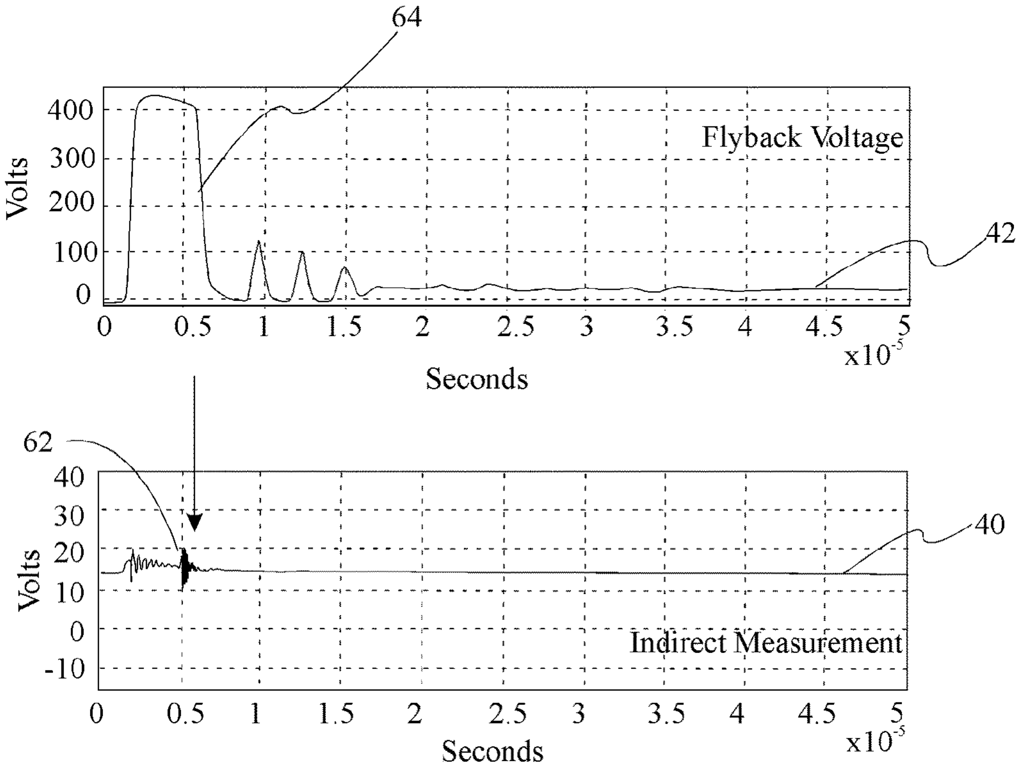
FIG. 4A illustrates signals measured at points (A) and (B) of FIG. 1, illustrated when a cylinder is not under compression.

FIG. 4A is a plot depicting a waveform for the indirect signal 40 and the flyback signal 42 as measured by the controller 34 when the ignition coil 13 is fired, and the cylinder is not under pressure. As noted above in connection with FIG. 1, the flyback signal 42 represents a measurement taken at point (B) of FIG. 1. As further noted above, data on the flyback signal 42 is not a signal that is capable of being ascertained because the housing within the CoP assembly 12 generally prevents access to point (B). The flyback signal 42 is described herein for illustrative purposes. Indirect signal 40 illustrates a simultaneously measured signal at point (A) of FIG. 1. By comparing the signals (e.g., the indirect and flyback) it is observed that different characteristics are present on both the indirect signal 40 and the flyback signal 42. For example, a rapid voltage decrease 64 is present on the flyback signal 42 when the magnetic field created by the primary coil 14 collapses. A HF burst is induced on the indirect signal 40 when the magnetic field created by the primary coil 14 collapses.

Figure 4B:
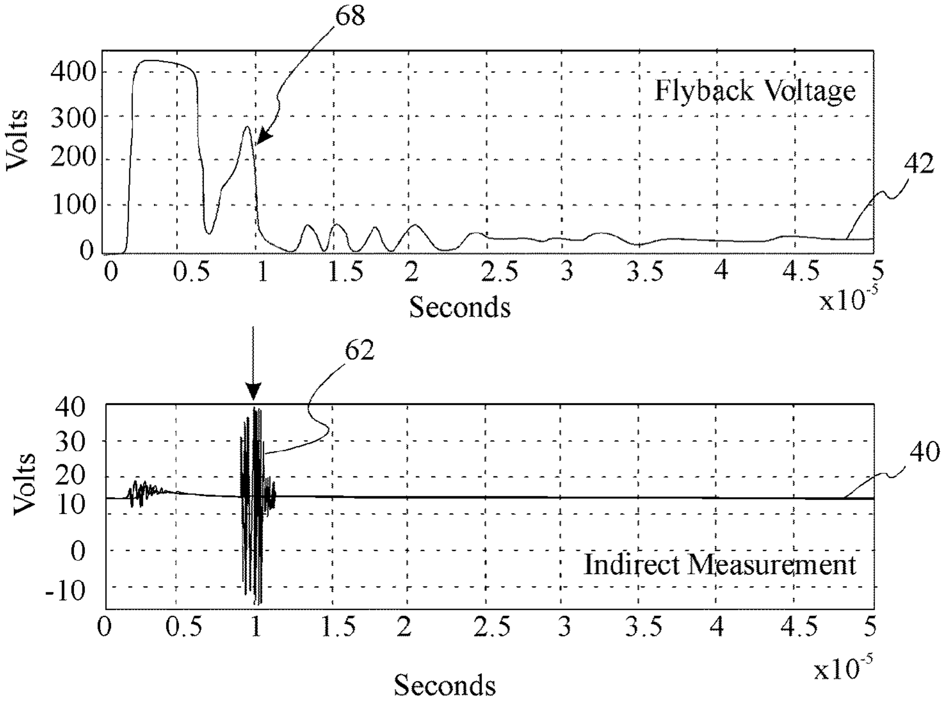
FIG. 4B illustrates the signals measured at points (A) and (B) of FIG. 1, illustrated when the cylinder is under compression.

FIG. 4B is a plot depicting a waveform for the indirect signal 40 and the flyback signal 42 as measured by the controller 34 when the ignition coil 13 is fired, and the cylinder is under pressure. As mentioned above, the proper firing of the ignition coil 13 should correspond to when the cylinder is under compression. Secondary arc events 68 are induced on the flyback signal 42. The HF component 62 that is present on the indirect signal 40 is created by arc events 68.

Referring to FIGS. 4A-5C, the controller 34 is configured to detect defects in the integrated CoP assembly 12 by analyzing an energy of the LF component and the amplitude and time delay of the HF component 62 on the indirect signal 40 within their corresponding frequency bands. As mentioned above in connection with FIG. 3, the LF component 60 is included in a frequency that is between 50 to 250 KHz, and the HF component 62 is included in a frequency that is between 2 to 30 MHZ. Typically, defects associated with the primary coil 14 are detected by analyzing the LF component 60 and defects associated with the secondary coil 16 are detected by analyzing the HF component 62. Such detectable defects may include, but are not limited to, primary circuit continuity issues, secondary circuit continuity issues, improper wiring connections, and improper gap spacing of the spark plug 24.

Figure 5A:
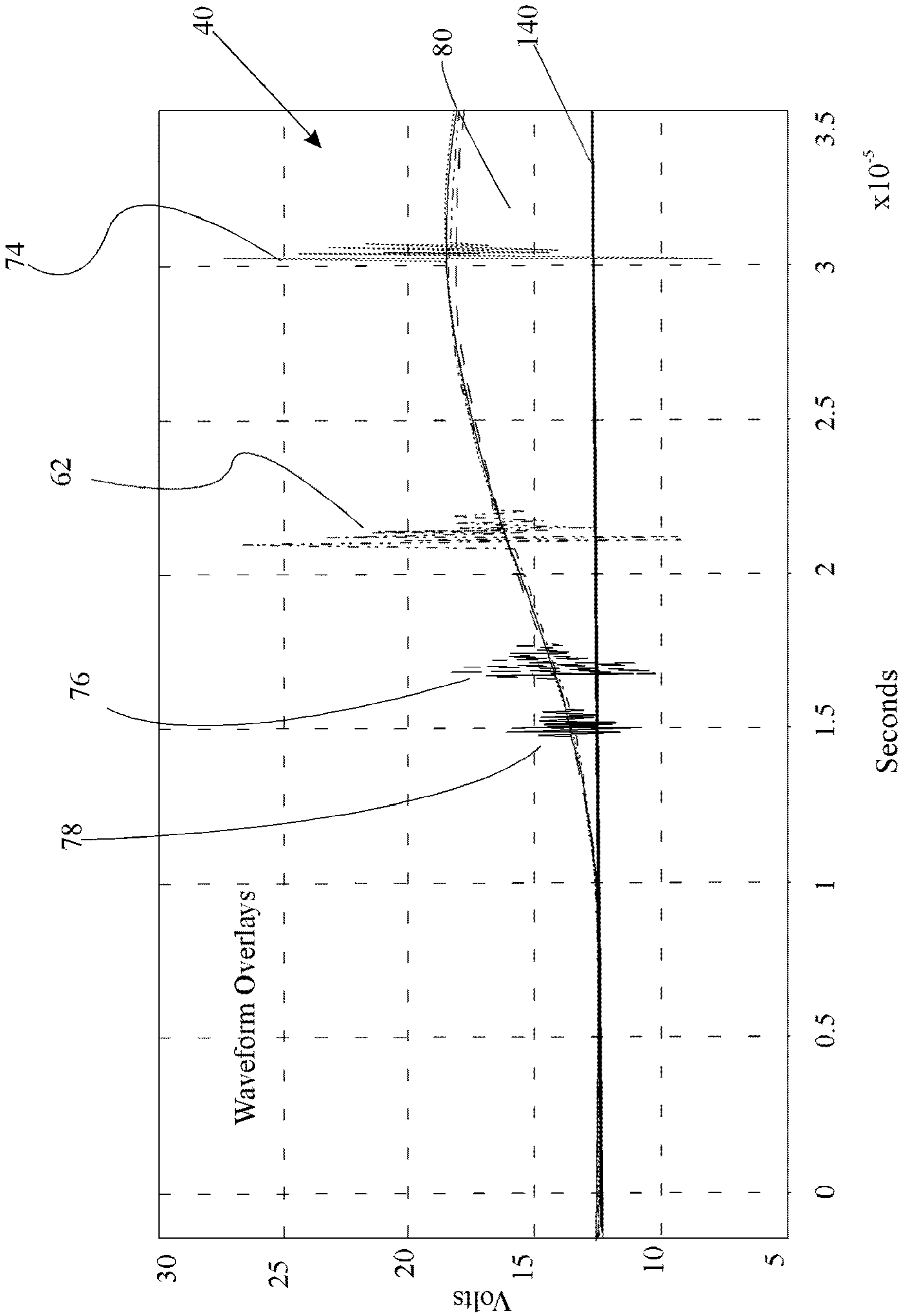
FIG. 5A illustrates the signals measured at point (A) of FIG. 1 for integrated coil on plug ignition systems having varying spark plug gap spacing.

Referring to FIG. 5A, the controller 34 may detect continuity defects along the primary circuit, by analyzing the energy of the LF component 60. The energy of the LF component 60 is measured by calculating the area under the waveform, and generally referenced as numeral 80. As noted above, the primary circuit is formed by the power supply 20, the primary coil 14, the switch 18, and the electrical connections between these components. Primary circuit continuity defects may include, but are not limited to, an open circuit in the primary coil 14, an open circuit in the switch 18 and an open circuit along the wire harness 23. By comparing the energy of the LF component 60 on the indirect signal 40 to predetermined data (e.g., a predetermined energy value), the controller 34 may detect a primary circuit continuity defect. For example, an open circuit in the primary circuit (e.g. within the primary coil 14, switch 18 or harness 23) may result in a generally flatline signal, represented by numeral 140, having a minimal energy measurement. Whereas a properly functioning (baseline) primary circuit may have an energy component as shown via numeral 80.

The controller 34 may also detect continuity defects along the secondary circuit, by analyzing the amplitude, and time delay of the HF component 62. As noted above, the secondary circuit is formed by the secondary coil 16, the spark plug 24 and the electrical connection between the components. Secondary circuit defects may include, but are not limited to, an open circuit in the secondary coil 16 and an open circuit in the electrical connection between the secondary coil 16 and the spark plug 24. By comparing the amplitude and the time delay of the HF component 62 on the indirect signal 40 to predetermined data (e.g., a predetermined amplitude and time delay), the controller 34 may detect a secondary circuit continuity defect. For example, an open circuit in the secondary circuit (e.g. within the secondary coil 16) may result in an indirect signal 40, absent a noticeable HF component 62 (not shown).

The apparatus 10 may also detect short circuit continuity defects in the event such defects were desired for detection.

With reference to FIGS. 4A-4B, the controller 34 may detect defective wiring connections along the ignition circuit 22. Such defective wiring connections may include, but are not limited to, improper connections to the switch 18 or improper connections to the ignition coil 13. A defective wiring connection may also be present in the event that the controller 34 fires an ignition coil 13 that is coupled to a cylinder that is not currently under compression. Defective wiring connections may be detected by analyzing the amplitude, frequency and time delay of the HF component 62 on the indirect signal 40.

The HF component 62 as shown in connection with FIG. 4A is generally indicative of a defective wiring connection. The HF component 62 as shown in connection with FIG. 4B is generally indicative of proper wiring connection. By comparing the high frequency components of FIGS. 4A and 4B, it is observed that the HF component 62 on the indirect signal 40 has a larger amplitude and greater time delay than the HF burst on the indirect signal 40 of FIG. 4A. In general, the controller 34 may determine the presence of a defective wiring connection by measuring the amplitude and the time delay of the HF component 62 on the indirect signal 40. The controller 34 may determine that a defective wiring connection is present if the measured amplitude and time delay on the HF component 62 of the indirect signal 40 is less than a predetermined amplitude and/or a predetermined time delay. For example, with reference to FIGS. 4A-4B, the threshold values for determining whether or not there is a defective wiring connection may be 10 Vpp and 0.7 s. It is generally recognized that the threshold values may vary based on the desired criteria of a particular implementation.

FIG. 5A generally is disclosed to describe the manner in which the controller 34 is capable of determining whether the gap of the spark plug 24 is properly spaced. For example, assume that the HF component 62 generally corresponds to a HF component 62 that may be exhibited if the gap of the spark plug 24 is properly spaced. In one example, the HF component 62 as shown in FIG. 5A may correspond to a spark plug 24 that includes a gap spacing of 0.038 in. The controller 34 may measure various HF components for a number of spark plugs and compare such measurements to the amplitude and time delay of the HF component 62 as depicted in FIG. 5A. Generally speaking, in the event the controller 34 determines that the HF component for a particular spark plug (e.g., under test) exhibits a smaller amplitude and a smaller time delay (e.g., see waveforms 76 and 78) than that exhibited by the HF component 62 in FIG. 5A. Then the controller 34 may determine that the particular spark plug that is being tested includes a gap that is smaller than desired gap (e.g., smaller than 0.038 in.), or shorted altogether. Waveform 76 depicts the amplitude and time delay for a particular spark plug that exhibits the condition in which a corresponding gap of the spark plug is 0.018 in. which is less than the desired gap of 0.038 in. Waveform 78 depicts the amplitude and time delay for a particular spark plug that exhibits the condition in which the gap of a particular spark plug is shorted together.

Likewise, in the event the controller 34 determines that the HF component for a particular spark plug (under test) exhibits a greater amplitude and a greater time delay (e.g., see waveform 74 in FIG. 5A) than that exhibited by the HF component 62 in FIG. 5A, then the controller 34 may determine that the particular spark plug being tested includes a gap that is greater than the desired gap. Waveform 74 of FIG. 5A depicts the amplitude and time delay for a particular spark plug that exhibits the condition in which a corresponding gap is greater than the desired gap spacing.

Figure 5B:
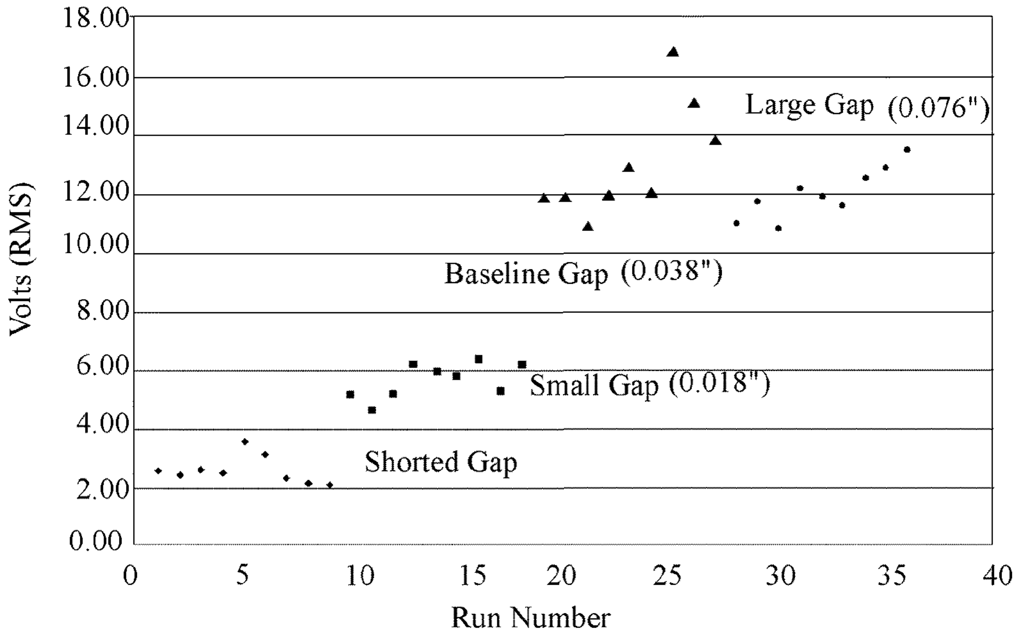
FIG. 5B is a plot illustrating a time delay between the firing of an ignition coil and the presence of a high frequency resonance feature of each signal of FIG. 5A.
Figure 5C:
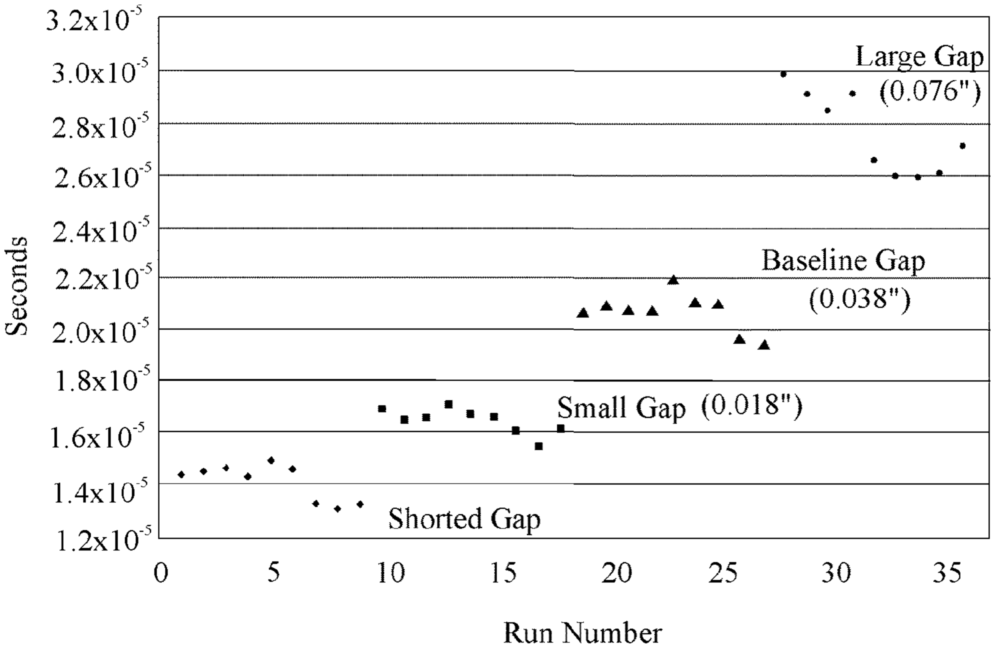
FIG. 5C is a plot illustrating an amplitude of the high frequency resonance feature of each signal of FIG. 5A.

FIGS. 5B-5C are provided to illustrate that the gap size for a spark plug can be ascertained as a function of the amplitude and time delay as measured on the indirect signal 40.

Figure 6:
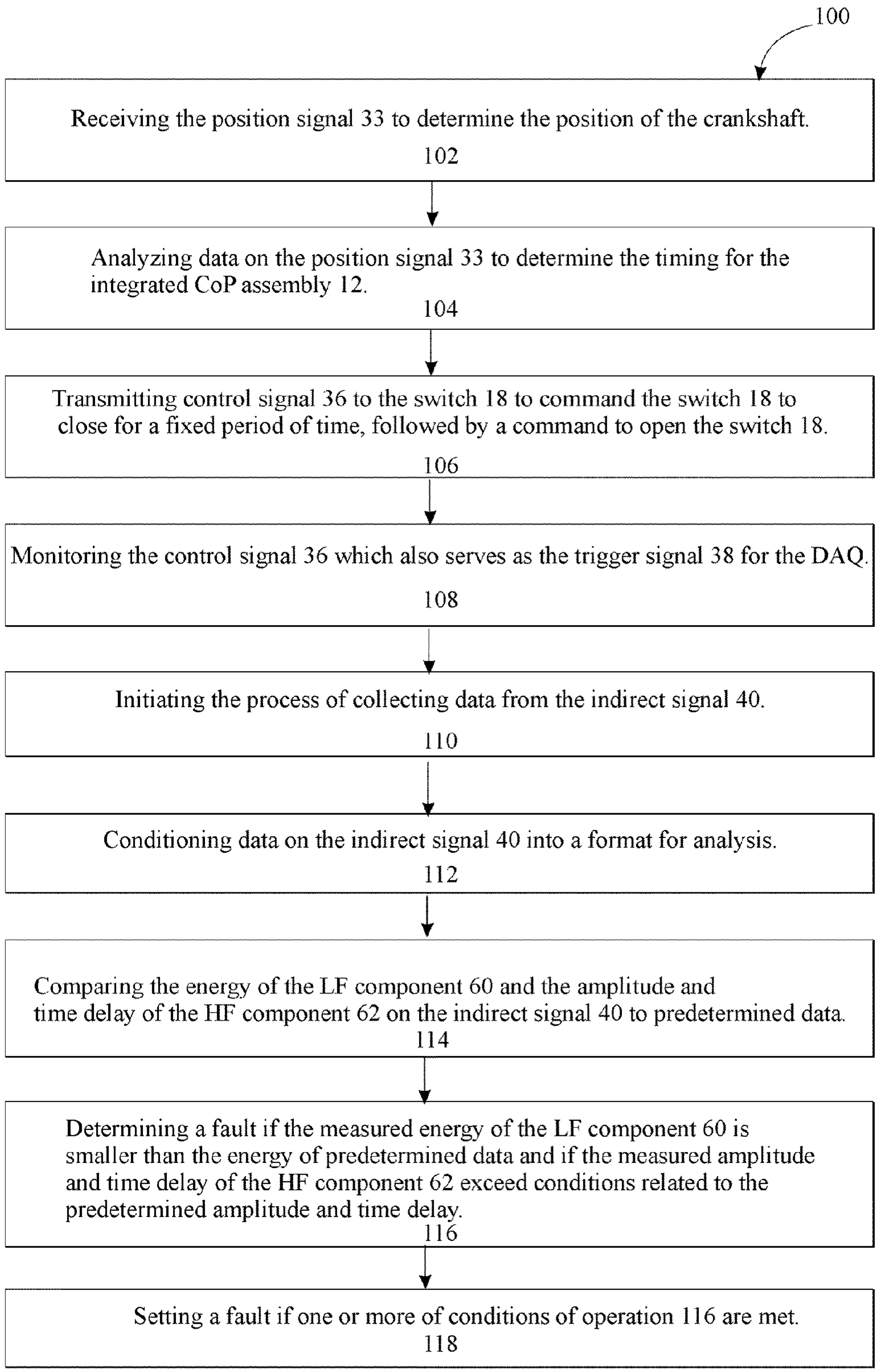
FIG. 6 is a flow chart illustrating a method for indirect measurement of the integrated coil on plug ignition system.

FIG. 6 illustrates a method 100 for evaluating the performance of the integrated CoP assembly 12. The controller 34 generally includes any number of microprocessors, ASICs, ICs, memory (e.g., FLASH, ROM, RAM, EPROM and/or EEPROM) which co-act with software code to perform the operations of the method 100.

In operation 102, the controller 34 receives the position signal 33 to determine the position of the crankshaft.

In operation 104, the controller 34 analyzes the data on the position signal 33 to determine the timing for the integrated CoP assembly 12 in order to make sure the spark plug is fired, via the ignition coil 13, when the corresponding cylinder is under compression.

In operation 106, the controller 34 transmits the control signal 36 to the switch 18 to command the switch 18 to close for a fixed "dwell" period of time, followed by a command for the switch 18 to open.

In operation 108, the controller 34 monitors the moment in which the control signal 36 is received at the switch 18 (e.g. to close the switch 18), which also serves as the trigger signal 38 for the DAQ.

In operation 110, the controller 34 initiates the process of collecting data. For example, an input of the controller 34 is hardwired into the ignition circuit 22 (e.g., at point (A)) to receive the indirect signal 40.

In operation 112, the controller 34 conditions data on the indirect signal 40 into a desired format for analysis.

In operation 114, the controller 34 compares the energy of the LF component 60 and the amplitude and the time delay that is present on the HF component 62 of the indirect signal 40 to predetermined data. For example, the controller 34 compares the energy of the LF component 60 to predetermined energy data. The controller 34 may compare the measured energy of the LF component 60 to the predetermined energy data to determine if the primary circuit has a continuity defect. The controller 34 also compares the amplitude and the time delay that is present on the HF component 62 of the indirect signal 40 to predetermined amplitude and time delay data to determine if the gap size for the spark plug 24 that is currently under test is correct.

In operation 116, the controller 34 may determine a continuity defect if the measured energy, is smaller than the predetermined energy. Such a condition may correspond to a continuity defect along the primary circuit (e.g. open circuit in the primary coil 14 or open circuit in the switch 18). Additionally the controller 34 may determine a gap size fault if the measured amplitude and the measured time delay is greater or smaller than the predetermined amplitude and the predetermined time delay, respectively. Such a condition may correspond to the gap size of the spark plug 24 being greater than or smaller than (or even shorted together) than the desired gap size of the spark plug 24.

In operation 118, the controller 34 sets a fault if one or more conditions of operation 116 are met.

While the best mode for carrying out the invention has been described in detail, those familiar with the art to which this invention relates will recognize various alternative designs and embodiments for practicing the invention as defined by the following claims.

What is claimed:

1. An apparatus for evaluating performance of an integrated coil on plug (CoP) assembly comprising:

a controller configured to:

transmit a control signal to activate the CoP assembly;

receive an indirect signal having a first characteristic associated with a low frequency (LF) component between 50 to 250 KHz from the CoP assembly responsive to the control signal; and compare the first characteristic to first predetermined data to evaluate the performance of the CoP assembly.

2. The apparatus of claim 1 wherein the first characteristic includes energy and the first predetermined data includes predetermined energy data and wherein the controller is further configured to compare the energy associated with the LF component to the predetermined energy data to determine a continuity defect in the apparatus.

3. The apparatus of claim 2 wherein the controller is further configured to determine the presence of a continuity defect between a primary coil and a switch positioned within the CoP assembly in the event the energy associated with the LF component is less than the predetermined energy data.

4. The apparatus of claim 1 wherein the indirect signal further includes at least one second characteristic associated with a high frequency (HF) component in a range of 2 to 30

MHz and wherein the controller is further configured to compare the at least one second characteristic of the HF component to second predetermined data to evaluate the performance of the CoP assembly.

5. The apparatus of claim 4 wherein the at least one second characteristic associated with the HF component includes an amplitude and a time delay and the second predetermined data includes at least one of a predetermined amplitude and a predetermined time delay and wherein the controller is further configured to compare at least one of the amplitude and the time delay to the at least one of a predetermined amplitude and a predetermined time delay to monitor a gap size for a spark plug coupled to the CoP assembly.

6. The apparatus of claim 4 wherein the at least one second characteristic associated with the HF component includes an amplitude and a time delay and the second predetermined data includes at least one of a predetermined amplitude and a predetermined time delay and wherein the controller is further configured to compare at least one of the amplitude and the time delay to the at least one of a predetermined amplitude and a predetermined time delay to determine the presence of a continuity defect between a secondary coil and a spark plug coupled to the CoP assembly.

7. The apparatus of claim 1 wherein the controller is electrically coupled to a primary coil within a housing of the CoP assembly, and wherein the controller is hardwired coupled to a point that is external to the housing for receiving the indirect signal therefrom.

8. The apparatus of claim 1 wherein the controller is hardwired coupled to a switch that is positioned within a housing of the CoP assembly for transmitting the control signal thereto.

9. A method for evaluating performance of an integrated coil on plug (CoP) assembly in an apparatus comprising:

transmitting a control signal to activate the CoP assembly;

receiving an indirect signal having a first characteristic associated with a high frequency (HF) component between 2 to 30 MHz from the CoP assembly responsive to the control signal; and comparing the first characteristic to first predetermined data to evaluate the performance of the CoP assembly.

10. The method of claim 9 wherein the first characteristic includes at least one of an amplitude and a time delay and the first predetermined data includes at least one of a predetermined amplitude and a predetermined time delay, and wherein comparing the first characteristic to first predetermined data further comprises comparing at least one of the amplitude and the time delay to at least one of the predetermined amplitude and the predetermined time delay to monitor gap size for a spark plug coupled to the CoP assembly.

11. The method of claim 9 wherein the first characteristic includes at least one of an amplitude and a time delay and the first predetermined data includes at least one of a predetermined amplitude and a predetermined time delay, and wherein comparing the first characteristic to first predetermined data further comprises comparing at least one of the amplitude and the time delay to at least one of the predetermined amplitude and the predetermined time delay to determine the presence of a continuity defect between a secondary coil and a spark plug coupled to the CoP assembly.

12. The method of claim 9 further comprising electrically coupling a controller to a primary coil within a housing of the CoP assembly, and wherein the controller is hardwired coupled to a point that is external to the housing such that the controller receives the indirect signal therefrom.

13. The method of claim 9 further comprising hardwire coupling a controller to a switch that is positioned within a housing of the CoP assembly for enabling transfer of the control signal thereto.

14. The method of claim 9 wherein receiving the indirect signal further comprises receiving the indirect signal having a second characteristic associated with a low frequency (LF) component, and wherein the second characteristic includes energy.

15. The method of claim 14 further comprising comparing the energy of the LF component to second predetermined data including predetermined energy data to determine a continuity defect in the apparatus.

16. The method of claim 15 wherein comparing the second characteristic associated with the LF component to second predetermined data further comprises determining the presence of a continuity defect between a primary coil and a switch positioned within the CoP assembly in the event the energy associated with the LF component is less than the predetermined energy data.

17. A method for evaluating the performance of an integrated coil on plug (CoP) ignition assembly in a vehicle, the method comprising:

controlling a switch positioned within the integrated CoP assembly to close for a fixed period of time, followed by controlling the switch to open to initiate a firing of a spark plug coupled to the CoP ignition assembly;

collecting an indirect signal associated with the firing of the spark plug; the indirect signal having a first characteristic associated with a low frequency (LF) component and at least one second characteristic associated with a high frequency (HF) component;

comparing the first characteristic and the at least one second characteristic to first predetermined data and second predetermined data respectively;

determining a defect based on the comparison; and setting a fault if a defect is determined.

18. The method of claim 17, wherein comparing the first characteristic and the at least one second characteristic further comprises comparing energy of the LF component to a predetermined energy value to determine the presence of a continuity defect between a primary coil and the switch.

19. The method of claim 17, wherein comparing the first characteristic and the at least one second characteristic further comprises comparing an amplitude of the HF component and a time delay of the HF component to a predetermined amplitude and a predetermined time delay, respectively, to determine the presence of a continuity defect between a secondary coil and the spark plug.

20. The method of claim 17, wherein comparing the first characteristic and the at least one second characteristic further comprises comparing an amplitude of the HF component and a time delay of the HF component to a predetermined amplitude and a predetermined time delay, respectively, to determine a gap size defect for the spark plug.

* * * * *